United States Patent [19]

Yokote et al.

[11] Patent Number: 5,651,129
[45] Date of Patent: *Jul. 22, 1997

[54] MODULAR HIGH-CAPACITY SOLID-STATE MASS DATA STORAGE DEVICE FOR VIDEO SERVERS INCLUDING A SWITCH FOR SIMULTANEOUS MULTI-VIEWER ACCESS

[75] Inventors: Timothy A. Yokote, Torrance; Grant J. Stockton, Long Beach; Eric L. Upton, North Redondo Beach; Arthur G. Enyedy, Redondo Beach; Dirk K. Brandis, Hermosa Beach, all of Calif.

[73] Assignee: TRW Inc., Redondo Beach, Calif.

[*] Notice: The term of this patent shall not extend beyond the expiration date of Pat. No. 5,471,603.

[21] Appl. No.: 611,353

[22] Filed: Mar. 6, 1996

Related U.S. Application Data

[63] Continuation of Ser. No. 100,824, Aug. 2, 1993, abandoned, which is a continuation-in-part of Ser. No. 963,192, Oct. 19, 1992, Pat. No. 5,471,603, which is a continuation-in-part of Ser. No. 744,050, Aug. 12, 1991, Pat. No. 5,289,377.

[51] Int. Cl.$^6$ .............................. G06F 13/00; H04N 7/10
[52] U.S. Cl. .................... 395/431; 395/432; 395/495; 348/7; 455/4.2
[58] Field of Search .......................... 395/431, 432, 395/438, 442, 495, 441; 348/7, 8; 370/58.1, 60, 60.1; 455/4.1, 4.2, 6.1, 6.3

[56] References Cited

U.S. PATENT DOCUMENTS

| | | | |
|---|---|---|---|
| 4,303,945 | 12/1981 | Fawcett et al. | 348/208 |
| 4,506,387 | 3/1985 | Walter | 455/6.1 |
| 5,027,400 | 6/1991 | Baji et al. | 455/6.3 |
| 5,133,079 | 7/1992 | Ballantyne et al. | 455/4.1 |
| 5,197,064 | 3/1993 | Chao | 370/60 |
| 5,283,877 | 2/1994 | Gastinel et al. | 395/432 |
| 5,289,377 | 2/1994 | Yokote et al. | 364/424.04 |
| 5,471,603 | 11/1995 | Yokote et al. | 395/402 |

FOREIGN PATENT DOCUMENTS

| | | |
|---|---|---|
| 402135 | 12/1990 | European Pat. Off. |
| 638046 | 10/1989 | France |

Primary Examiner—Glenn Gossage
Attorney, Agent, or Firm—Robert W. Keller; Noel F. Heal

[57] ABSTRACT

A modular solid-state mass data storage device providing high-density, high capacity storage of numerous full-length movies for video server applications. The mass data storage device employs a modular pipeline architecture in which a distributed array of controller/memory modules is arranged in parallel controller/memory channels on one or more controller/memory cards. The modular pipeline architecture, in which each controller/memory channel has multiple controller/memory modules connected in a serial chain by address, data and control buses, allows the number of controller/memory modules in each channel and the number of controller/memory channels to be selected to accommodate a desired storage size and transfer rate, without an undesirably high latency time. An asynchronous transfer mode (ATM) switch allows multiple viewers to access the movies stored in the mass data storage device with independent video cassette recorder (VCR)-like control of the movie being watched. In a disclosed embodiment, the controller/memory modules in each channel are connected to first and second buses which extend from a data format module, the first bus also extending from the last controller/memory modules in each channel back to the data format module. The data format module provides data formatting, synchronization and error correction for the stored movies. In the disclosed embodiment, each controller/memory module includes an array of dynamic random access memory (DRAM) chips, and multiple controller/memory modules are packaged in standard memory module packages, such as single in-line memory module (SIMM) packages.

9 Claims, 2 Drawing Sheets

MODULAR HIGH-CAPACITY SOLID-STATE MASS DATA STORAGE DEVICE FOR VIDEO SERVERS INCLUDING A SWITCH FOR SIMULTANEOUS MULTI-VIEWER ACCESS

This application is a continuation of U.S. patent application Ser. No. 08/100,824, filed Aug. 2, 1993, now abandoned, which is a continuation-in-part of a application by Timothy A. Yokote et al. entitled "Modular High-Capacity Solid-State Mass Data Storage Device," Ser. No. 07/963,192, filed on Oct. 19, 1992, now U.S. Pat. No. 5,471,603, which is a continuation-in-part of a application by Timothy A. Yokote et al. entitled "Fault-Tolerant Solid-State Flight Data Recorder," Ser. No. 07/744,050, filed on Aug. 12, 1991, now U.S. Pat. No. 5,289,377.

BACKGROUND OF THE INVENTION

This invention relates generally to mass data storage devices and, more particularly, to solid-state random access memory (RAM) mass data storage devices for video server applications.

Video-on-demand will provide home television viewers the ability to watch movies of their choice at any time of the day in the comfort of their homes. Centrally located video servers will store current popular movies and allow thousands of viewers simultaneous access to these movies at any one time. Less popular current movies or older movies will be downloaded to the video server upon demand. Home television sets will be connected to the video servers by phone lines, using either copper or fiber optic cables. Each viewer will have independent video cassette recorder (VCR) -like control over the movie being watched.

Each video server will include some type of mass data storage device for storing the movies. Hard disk or optical disk storage devices could be used, but the latency times are too long for independent VCR-like control of numerous movies by thousands of viewers. Magnetic tape does not allow for multiple accesses of a movie at different times or independent VCR control of a movie by different viewers. Therefore, the mass data storage device will likely be a solid-state RAM storage device. However, solid-state RAM mass data storage devices still do not provide the high densities and large memory capacities that are required by video servers, even though refinements in semiconductor fabrication techniques have reduced the unit cost and increased the unit density of solid-state RAM memory devices. Accordingly, there has been a need for a high-capacity solid-state mass data storage device for video server applications. The present invention clearly fulfills this need.

SUMMARY OF THE INVENTION

The present invention resides in a modular solid-state mass data storage device providing high-density, high-capacity storage of numerous full-length movies for video server applications. The mass data storage device employs a modular pipeline architecture in which a distributed array of controller/memory modules is arranged in parallel controller/memory channels on one or more controller/memory cards. The modular pipeline architecture allows the number of controller/ memory modules in each channel to be easily configured to accommodate any required storage size and the number of controller/memory channels to be configured to accommodate any required storage size and transfer rate, without increasing latency time. The modular pipeline architecture also greatly simplifies the complexity of the memory controllers, and high-density packaging of the controller/memory modules provides compact storage for large amounts of data. An asynchronous transfer mode (ATM) switch allows multiple viewers to access the movies stored in the mass data storage device with independent VCR-like control of the movie being watched.

In a preferred embodiment of the present invention, each controller/memory card includes eight parallel controller/memory channels. Each controller/memory module includes an 8×4 array of 4 megabit (MBit) dynamic random access memory (DRAM) chips for a total memory capacity per module of 16 megabytes (MBytes). Each set of eight parallel controller/memory modules is packaged in two high-density single in-line memory modules (SIMMs), for a total memory capacity per SIMM module of 64 MBytes and a data transfer rate of 200 MBytes/sec. Each controller/memory card includes twenty SIMMs a total memory capacity of 1.0 gizabyte (Gbyte) with error correction. Each controller/memory card can store one full-length movie with compression. Sixty four controller/memory cards provide a total memory capacity of 64 GBytes and can store sixty four full-length movies.

It will be appreciated from the foregoing that the present invention represents a significant advance in the field of solid-state mass data storage devices for video server applications. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
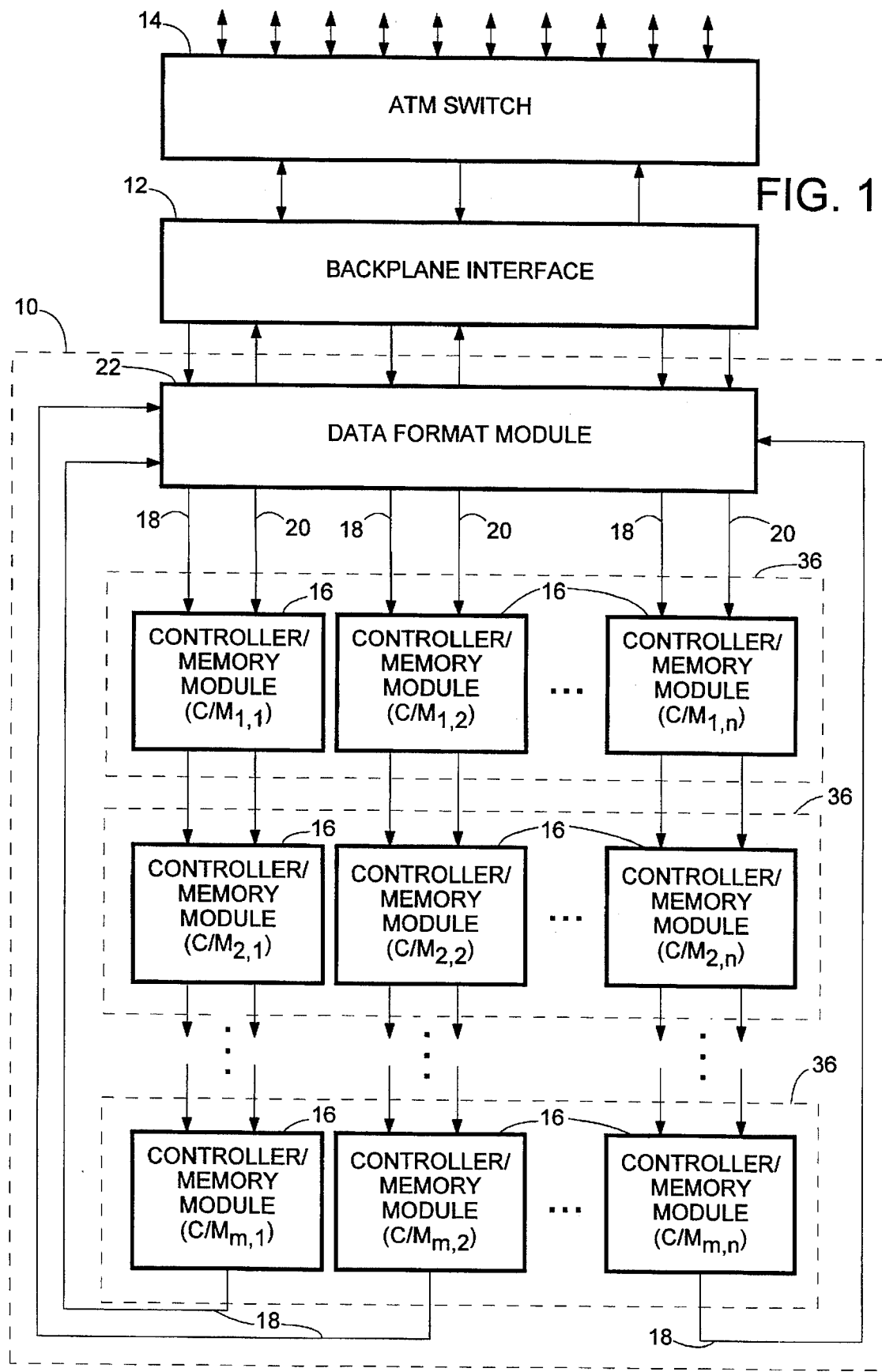
FIG. 1 is a block diagram of a modular, high-capacity solid-state mass data storage device for video server applications in accordance with the present invention.

As shown in the drawings for purposes of illustration, the present invention is embodied in a modular solid-state mass data storage device providing high-density, high-capacity storage of numerous full-length movies for video server applications. The mass data storage device employs a modular pipeline architecture in which a distributed array of controller/memory modules is arranged in parallel controller/memory channels on one or more controller/memory cards. The modular pipeline architecture allows the number of controller/memory modules in each channel to be easily configured to accommodate any required storage size and the number of controller/memory channels to be configured to accommodate any required storage size and transfer rate, without increasing latency time. The modular pipeline architecture also greatly simplifies the complexity of the memory controllers, and high-density packaging of the controller/memory modules provides compact storage for large amounts of data. An asynchronous transfer mode (ATM) switch allows multiple viewers to access the movies stored in the mass data storage device with independent VCR-like control of the movie being watched.

As illustrated in FIG. 1, the mass data storage device of the present invention includes one or more controller/memory cards 10 which plug into a back-plane through a backplane interface 12. An asynchronous mode transfer mode switch 14 allows multiple viewers to access the movies stored in the controller/memory cards 10. Each controller/memory card 10 includes a distributed array of controller/memory modules 16 which are arranged in parallel controller/memory channels. In each channel, the controller/memory modules 16 are connected to first and second buses 18, 20 which extend from a data format module 22. The first bus 18 also extends from the last controller/memory module 16 in each channel back to the data format module 22. The data format module 22 provides data formatting, synchronization and error correction for the data stored in the modules 16. The modular pipeline architecture of the controller/memory channels allows the number of controller/memory modules 16 in each channel to be easily configured to accommodate any required storage size and the number of controller/memory channels to be configured to accommodate any required storage size and transfer rate, without increasing latency time.

Figure 2:
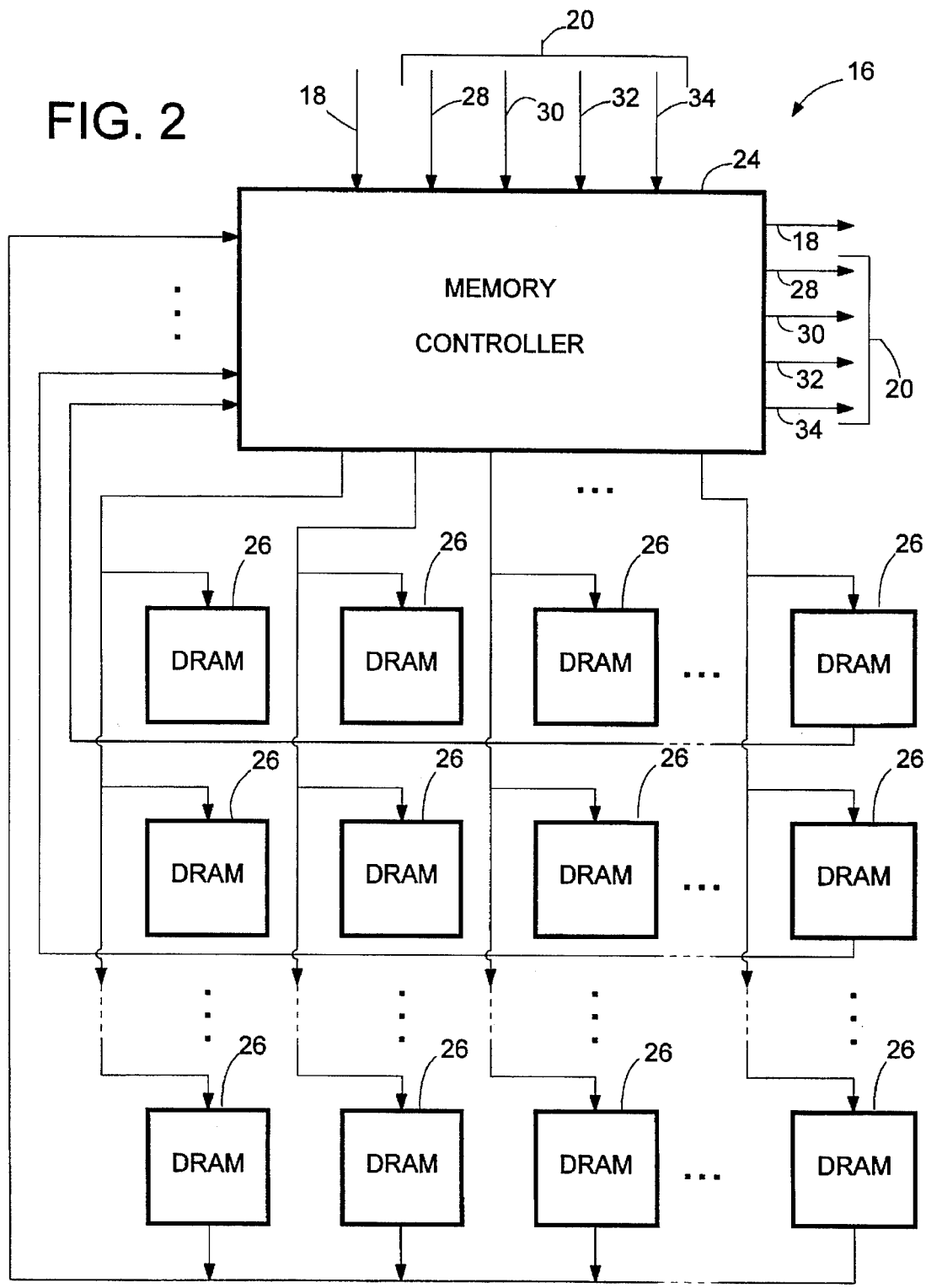
FIG. 2 is a block diagram of a controller/memory module in the mass data storage device of the present invention.

As illustrated in FIG. 2, each controller/memory module 16 includes a memory controller 24 and an array of solid-state dynamic random access memory (DRAM) chips 26. The memory controller 24, which can be greatly simplified because of the pipeline architecture of the present invention, performs all of the basic control functions necessary for accessing the DRAM chips 26. These functions include controlling and addressing the DRAM chips for read/write operations and refreshing the DRAM chips. Each DRAM chip 26 is connected to a memory controller 24 and each memory controller 24 is connected to the other memory controllers in the same channel by the first and second buses 18, 20. The first bus 18 includes a read data bus and the second bus 20 includes a read address bus 28, a write address bus 30, a write data bus 32 and a control bus 34.

The read and write buses use a pipeline architecture for both data and address transfers. For the write operation, the write addresses on the write address bus 30 and the data on the write data bus 32 are clocked through the memory controllers 24 in a particular channel until an address matches the write location. The data is then written into that location in the DRAM chip. For the read operation, the read addresses on the read address bus 28 are clocked through the memory controllers 24 in a particular channel until an address matches the read location. The data is retrieved and then clocked on through the remaining memory controllers 24 in that channel on the read data bus 18 back to the data format module 22.

In a preferred embodiment of the present invention, each controller/memory card 10 includes eight parallel controller/memory channels. Each controller/memory module 16 includes an 8×4 array of 4 MBit DRAM chips 26 for a total memory capacity per module of 16 MBytes. Each set of eight parallel controller/memory modules 16 is packaged in two high-density single in-line memory modules (SIMMs) 36, for a total memory capacity per SIMM of 64 MBytes and a data transfer rate of 200 megabytes/second (Mbytes/sec). Each controller/memory card 10 includes twenty SIMMs 36 for a total memory capacity of 1.0 GByte with error correction. Each controller/memory card 10 can store one full-length movie with compression. Sixty four controller/memory cards 10 provide a total memory capacity of 64 GBytes and can store sixty four full-length movies.

Each controller/memory board 10 can simultaneously serve over 1000 viewers, with each viewer having total video cassette recorder (VCR)-like control of the movie. Using a dual input/output (I/O) of 200 MBytes/sec, an overhead of 48 Bytes/block access, a user line rate of 1.55 MBit/sec, and a block size greater than 100 Kilobytes (KBytes), the number of simultaneous accesses is: (I/O Rate×Block Size)/[Line Rate×(Block Size +Overhead)], which is (1600 MBit/sec×100 KBytes)/[1.55 MBit/sec×(100 KBytes +48 Bytes)] or 1031. Therefore, with a block size of 100 KBytes, up to 1031 viewers can have simultaneous access to each movie. Fifteen accesses can be stacked up at a time.

The read and write buses are eight bit buses which are demultiplexed at a ratio of 1:4 and multiplexed at a ratio of 4:1 to reduce system interconnects and memory controller input/output. The controller/memory modules 16 are completely synchronous with all read and write data transfers and the read and write addresses are synchronously clocked for reliable timing. Latency time to any address is less than 10 microseconds.

Less popular current films or older movies will be stored on magnetic tape, hard disk or optical disk and downloaded on demand. Magnetic tape systems have data transfer rates of 20 MBytes/sec and hard disks have data transfer rates of 30 MBytes/sec. At 20 MBytes/sec, a 1 GByte compressed movie can be downloaded in 50 seconds. A typical video server system will require a workstation and an interface for controlling the mass data storage device.

From the foregoing, it will be appreciated that the present invention represents a significant advance in the field of solid-state mass data storage devices for video server applications. Although a preferred embodiment of the invention has been shown and described, it will be apparent that other adaptations and modifications can be made without departing from the spirit and scope of the invention. Accordingly, the invention is not to be limited, except as by the following claims.

We claim:

1. A modular solid-state mass data storage device providing high-density, high-capacity storage of one or more movies for video servers, comprising:

a distributed array of controller/memory modules arranged in parallel controller/memory channels on one or more memory cards, the distributed array having a modular pipeline architecture in which each controller/memory channel has multiple controller/memory modules connected in a serial chain by address, data and control buses, and wherein the number of controller/memory modules in each channel and the number of controller/memory channels are selected to accommodate a desired storage size and transfer rate, without an undesirably high latency time; and an asynchronous transfer mode (ATM) switch for simultaneous access by multiple viewers of the one or more movies stored in the controller/memory modules:

and wherein the address, data and control buses connecting the controller/memory modules in each channel include first and second buses which extend from a data format module, the first bus also connecting an output of the last controller/memory module in each channel back to an input of the data format module.

2. The mass data storage device as set forth in claim 1, wherein the data format module provides data formatting, synchronization and error correction for the one or more movies stored in the controller/memory modules.

3. The mass data storage device as set forth in claim 1, wherein each memory card in the mass data storage device includes eight controller/memory channels, each controller/memory module has a memory capacity of 16 megabytes (MBytes), and each memory card has a total memory capacity of over 1 gigabyte (GByte).

4. The mass data storage device as set forth in claim 3, wherein every eight parallel controller/memory modules are packaged in a single in-line memory module (SIMM).

5. The mass data storage device as set forth in claim 1, wherein each controller/memory module includes an array of dynamic random access memory (DRAM) chips and a memory controller for performing control functions with respect to the array of DRAM chips.

6. The mass data storage device as set forth in claim 5, wherein each DRAM chip in a controller/memory module is connected to the memory controller for the same controller/memory module, and each memory controller is connected to the other memory controllers in the same channel by the first and second buses.

7. The mass data storage device as set forth in claim 6, wherein the first bus includes a read data bus and the second bus includes a read address bus, a write address bus, a write data bus and a control bus.

8. A modular solid-state mass data storage device providing high-density, high-capacity storage of one or more movies for video servers, comprising:

a distributed array of controller/memory modules arranged in parallel controller/memory channels on one or more memory cards, the distributed array having a modular pipeline architecture in which each controller/memory channel has multiple controller/memory modules connected in a serial chain by address, data and control buses, and wherein the number of controller/memory modules in each channel and the number of controller/memory channels are selected to accommodate a desired storage size and transfer rate, without an undesirably high latency time; and a switch operable to provide simultaneous access by multiple viewers of the one or more movies stored in the controller/memory modules;

and wherein the address, data and control buses connecting the controller/memory modules in each channel include first and second buses which extend from a data format module, the first bus also connecting an output of the last controller/memory module in each channel back to an input of the data format module.

9. A method for configuring and operating a modular solid-state mass data storage device providing high-density, high-capacity storage of one or more movies for video servers, comprising the steps of:

distributing an array of controller/memory modules in parallel controller/memory channels on one or more memory cards;

selecting the number of controller/memory modules in each channel and the number of controller/memory channels to accommodate a desired storage size and transfer rate, without an undesirably high latency time;

connecting the controller/memory modules in each controller/memory channel in a serial chain by address, data and control buses, which buses include first and second buses extending from a data format module, and including the step of connecting an output of the last controller/memory module in each channel back to an input of the data format module; and switching output data derived from the controller/memory modules to multiple viewer destinations, to allow multiple viewers to have simultaneous access to the one or more movies stored in the controller/memory modules.

* * * * *